United States Patent
Fikis et al.

[11] Patent Number: 6,167,129
[45] Date of Patent: Dec. 26, 2000

[54] METHOD AND APPARATUS FOR SIGNAL MEDIATION IN A COMMON CHANNEL SIGNALING NETWORK

[75] Inventors: Gerald W. Fikis, Nepean; H. Stewart Patch, Orleans, both of Canada; Michael J. Mueller, Raleigh, N.C.; Venkat Ravishankar, Apex, N.C.; Dean D. Glenn, Cary, N.C.; Virgil E. Long, Raleigh, N.C.; Lee B. Smith, Apex, N.C.; Richard Arthur Leonard Ellis, Kanata; Brian Frederick George Bidulock, Ottawa, both of Canada

[73] Assignee: Tekelec, Calabasas, Calif.

[21] Appl. No.: 09/055,087

[22] Filed: Apr. 3, 1998

[51] Int. Cl.[7] ................ H04M 7/00; H04J 3/12
[52] U.S. Cl. ............ 379/230; 370/426; 370/522; 379/220
[58] Field of Search .................. 370/522, 426; 379/219, 220, 229, 230

[56] References Cited

U.S. PATENT DOCUMENTS

| | | | |
|---|---|---|---|
| 5,430,719 | 7/1995 | Weisser, Jr. ............ | 370/389 |
| 5,586,177 | 12/1996 | Farris et al. ............ | 379/230 |
| 5,701,301 | 12/1997 | Weisser, Jr. ............ | 370/428 |
| 5,862,334 | 1/1999 | Schwartz et al. ............ | 379/220 X |
| 5,881,145 | 3/1999 | Giuhat et al. ............ | 379/220 X |
| 5,953,404 | 9/1999 | Fikis et al. ............ | 379/230 |

*Primary Examiner*—Harry S. Hong
*Attorney, Agent, or Firm*—Cobrin & Gittes

[57] ABSTRACT

A method and apparatus for signal mediation in a common channel signaling network are described. The method involves identifying candidate message signal units that require mediation and transmitting the candidate signal unit to an associated mediation function which performs access mediation on the contents of the candidate signal unit. The access mediation function may return one or more data packets to the network. The apparatus includes the signal transfer point, the associated mediation function and enhanced functionality in the signal transfer point for screening candidate signal units. The advantage is a more flexible and easily managed signal mediation point that removes the bulk of signal mediation from the signal transfer point so that the signal transfer point can remain dedicated to its signal transfer function.

20 Claims, 6 Drawing Sheets

METHOD AND APPARATUS FOR SIGNAL MEDIATION IN A COMMON CHANNEL SIGNALING NETWORK

FIELD OF THE INVENTION

The present invention generally relates to digital data communications, and in particular to a method and apparatus for telecommunications signaling. More specifically, the invention relates to Signal Transfer Points and an enhancement to functions normally provided in these devices to support both signaling network access and service mediation. Still more specifically, this invention relates to enhancements of the functions of a Signal Transfer Point that will permit messages to be diverted or copied to an alternate route for the purpose of accessing a mediation devise.

BACKGROUND OF THE INVENTION

In the past, signaling points deployed in the North American Signaling System 7 (SS7) networks were owned and operated by traditional (now often referred to as "incumbent") service providers such as Bell Canada in Canada and American Telephone and Telegraph in the United States. Each SS7 network was therefore, a closed system and its integrity was maintained by the respective service providers who used tight procedural controls and access to information about the network's operation to ensure its security. Deregulation of the telecommunications industry is now forcing more open access to the SS7 networks.

The impetus for the present invention results from the evolving and increasingly liberalized access to SS7 networks. An additional impetus results from the growth and evolution of existing, and future potential SS7 dependent services. Some SS7 dependent services will require service mediation due to the existence of service interworking incompatabilities.

For more than a decade parts of the North American telephone networks have been open to competition. As a result, the networks of new service providers have introduced additional network-to-network interconnection requirements. This exposes the SS7 networks of both the incumbent as well as the new service providers to new risks, despite the fact that network access is still tightly controlled and inter-operating telephone companies sign agreements and follow procedures to preserve the integrity of the networks. Nonetheless, to ensure the stability and integrity of the networks, defensive measures were developed. For example, the SS7 protocol and signaling point behavior were enhanced with Gateway Screening functions to block data packets from entering an SS7 network if they did not conform to a predefined format and content.

Particularly during the last several years, there has also been a substantial growth in the type and number of SS7 dependent services offered to the service subscriber community, including: CLASS[SM], ISDN, AIN, IN, 800, LIDB, PCS, Cellular Mobile, and Local Number portability. Due to adverse feature interactions associated with some of these services, "active" mediation, which includes service prioritization, may be required when a user subscribes to multiple services.

The telephone industry is now looking to further increase openness to its networks, including the SS7 network, for reasons mandated by both government and commerce. As broad access to each SS7 network is increased, however, concern about preserving the integrity of that network escalates because of the fact that the network is integral to the provision of telecommunications services. In order to allay these concerns, business and engineering agreements may be used to define the parameters for SS7 network inter-operation between two service providers. Management of those agreements can be most effectively supported through automated procedures referred to as "mediated access". In addition, the telephone industry is actively seeking to address its growing concern with SS7 service interworking. The management of service interworking procedures can also be supported through the same automated mediation procedures.

Co-pending patent application Ser. No. 08/833,986 filed 11 Apr. 1997 and entitled *Method and System for Providing Mediated Access Between Signalling Networks* describes a functionally expanded and network centralized embodiment of mediated access called a Signaling Mediation Point (SMP). The SMP is conceived as a new Network Element "dedicated to providing a mediation function". Developing an SMP is relatively difficult, costly, and time-consuming. Besides, the SMP is a new network element which is yet to be proven in the network.

Therefore, a need exists for a mediation access point which is more familiar to the SS7 user community and yet overcomes problems associated with the prior art.

SUMMARY OF THE INVENTION

It is therefore, an object of the present invention to provide an enhanced signaling point having a transfer function which performs mediated access to an SS7 network. Mediated access includes both network and service access mediation.

Another object of the present invention is to provide an enhanced signaling point having a transfer function which is capable of active and/or passive access mediation.

Another object of the present invention is to provide an enhanced signaling point having a transfer function and means for recognizing those signal units that are candidates for mediation.

Another object of the present invention is to provide an enhanced signaling point having a transfer function and means for either diverting or copying mediation candidate Signal Units to a mediation function.

Another object of the present invention is to provide an enhanced signaling point having a transfer function wherein Signal Units accepted from the mediation function are reintroduced into the SS7 network without recognizing them as having been "mediated".

Another object of the present invention is to provide an enhanced signaling point having a transfer function which is capable of optionally embedding mediation candidate Signal Units into an SS7 message or message set before sending it to the mediation function.

Another object of the present invention is to provide an enhanced signaling point having a transfer function which is capable of optionally extracting mediation candidate signal units from an SS7 message or message set after receiving it from the mediation function.

Another object of the present invention is to provide an enhanced signaling point having a transfer function which is capable of managing the mediation function as a "subsystem" as defined in the American National Standards Institute ("ANSI") Standard T1.112.

Another object of the present invention is to provide an enhanced signaling point having a transfer function which limits the number of mediation candidate Signal Units to be sent to the mediation function.

An SS7 network is composed of signaling nodes interconnected by linksets. The signaling nodes are generally either Service Switching Points (SSP), Service Control Points (SCP), or Signal Transfer Points (STP). An SSP behaves as a client, an SCP behaves as a server, and an STP behaves as a packet router in the SS7 network. The behavior of an STP is described in the Bellcore document GR-82-CORE. Linksets are logical groups of point-to-point links commonly based on 56 Kb/s synchronous serial digital communications in an HDLC format. The STP also commonly serves as a point where two or more SS7 networks interconnect and in this configuration, these STPs are commonly known as "Gateway STPs". The STP is therefore an appropriate location for an access mediation function.

In accordance with the present invention, an STP and a mediation function are associated to form an SMP. The STP provides a well defined and accepted interface to the SS7 network. The STP in accordance with the invention is enhanced to recognize which signal units are candidates for mediation. Mediation candidate Signal Units are either diverted or copied to the mediation function. The mediation function may accumulate statistics, modify, copy, suppress, pass along unchanged or arbitrarily change any Signal Unit that it receives. The mediation function relies solely on the STP for access to the SS7 network.

Dividing SMP tasks between an STP and mediation function is optimal because it builds on the strengths and minimizes the weaknesses of each component. An STP is a well accepted interface to the SS7 network. The STP is particularly suited to quickly and efficiently recognize and transfer signal units. On the other hand, each new release of the STP must undergo close scrutiny and pass stringent industry accepted tests. Industry accepted STPs are complicated mission specific arrays of many processors. Consequently, it is difficult to embed an evolving and possibly instance specific access mediation application in standard STP architecture. A general purpose function designed for high availability is a preferable development and deployment platform for a mediated access application. Unfortunately, adding SS7 network interfaces to such functions is expensive and does not provide a complete solution. By integrating an STP and a mediation function using a special communications channel, the present invention efficiently provides a viable SMP.

Given that the STP is an entry point for access to an SS7 network, and given the desire for network access mediation, there is a need for enhancements in the STP that will facilitate economical development and deployment of SMPs.

DESCRIPTION OF THE PREFERRED EMBODIMENTS

TABLE OF ACCRONYMS

Figure 1:
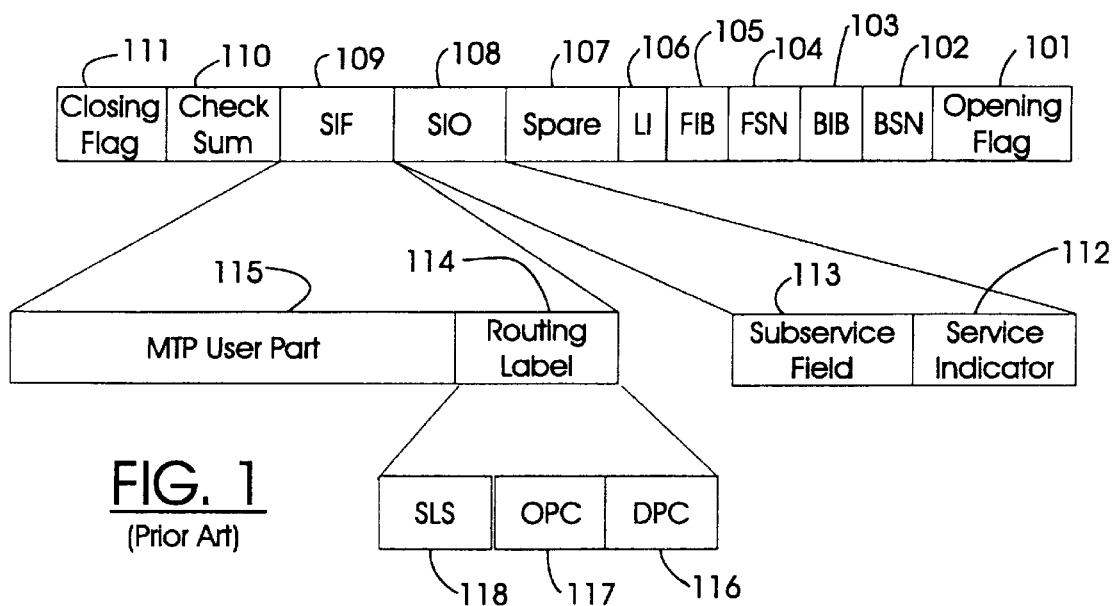
FIG. 1 is a schematic diagram of the structure of an SS7 Message Signaling Unit (MSU) and a partial decomposition thereof.

In order to lighten the following description, the following acronyms will be used:

AIN: Advanced Intelligent Network (conceptualized by Bell Communications Research Inc., also known as "Bellcore")
BIB: Backward Indicator Bit
BSN: Backward Sequence Number
CCS7: Common Channel Signaling (System) 7 (also known as "SS7")
CIC: Circuit Identification Code (an SS7 parameter)
DP: Destination Point
DPC: Destination Point Code (an SS7 parameter)
EGWS: Enhanced Gateway Screening
FIB: Forward Indicator Bit
FISU: Fill-in Signal Units
FSN: Forward Sequence Number
GTT: Global Title Translation
GWS: Gateway Screening
HDLC: High Level Data Link Control
IAM: Initial Address Message (an SS7 ISUP message type)
ID: Identification
IN: Intelligent Network
ISUP: Integrated Services (Digital Network) User Part (an SS7 protocol part) (also known as ISDN User Part)
LI: Length Indicator
LSSU: Line Status Signal Units
MF: Mediation Function
MSC: Mobile Switching Center
MSU: Message Signal Unit
MTP: Message Transfer Part (an SS7 protocol part)
OP: Originating Point
OPC: Originating Point Code (an SS7 parameter)
PC: Point Code
SDL: Specification and Description Language (developed by ITU-T (formerly CCITT))
SIF: Signaling Information Field
SIO: Service Information Octet
SP: Signaling Point
SCP: Service Control Point
SCCP: Signaling Connection Control Part (an SS7 protocol part)

SEP: Signaling End Point

SMP: Signaling Mediation Point

SSN: Sub-System Number (part of an SCCP address)

SSP: Service Switching Point

SS7 Signaling System (Number) 7 (also known as "CCS7")

STP: Signaling Transfer Point

TCAP: Transaction Capabilities Application Part (an SS7 protocol part)

Note that AIN is considered an implementable subset of the international standards developed by the ITU-T, therein identified as "IN". For the purposes of this document, IN will be used hereinafter to designate both the Intelligent and Advanced Intelligent Network, and solutions should be treated as equally applicable to both IN and AIN Telecommunications network operators desire a platform that can provide unlimited user definable control over the flow of MSUs through a particular signaling point in the SS7 network. This expanded range of control (and defined in the above identified co-pending patent application) is referred to as SS7 Mediated Access. Mediated Access permits telecommunication network operators to offer access to their SS7 networks by foreign operators while limiting the foreign operator's ability to adversely impact or control the network or use the network beyond the scope of a business agreement. In addition, Mediated Access will permit service interworking for services originating from both foreign and internal network service providers. The present invention provides a means for rapidly developing a platform to support Mediated Access that will be readily accepted by the telecommunications industry.

Prior to discussing the features of the present invention, an introduction to related concepts and terminology is desirable. This introduction provides a brief overview of the SS7 protocol, the SS7 network, the purpose of the STP, the operation of an SS7 link, message routing, and Gateway Screening.

SS7 Protocol

Modern Public Switched Telecommunications Networks (PSTNS) consist of a physical switch and facility network plus a control network. The control network is based on the Signaling System 7 (SS7) digital data communications protocol. The SS7 protocol is an evolving means by which software controlled entities in the telecommunication network exchange information related to a growing number of telephone services and service features. Various entities, generically referred to as Signaling Points ("SPs"), are connected together in an SS7 network. Each signaling point in the SS7 network is assigned a unique address referred to as a Point Code.

The SS7 protocol is a layered, packet-oriented protocol which incorporates the High level Data Link Control (HDLC) bit-oriented protocol. In the terminology of SS7, packets are called Signal Units. There are three types of signal units: 1) Fill-in Signal Units (FISU), 2) Link Status Signal Units (LSSU), and 3) Message Signal Units (MSU).

Signal Units flow bi-directionally between two adjacent SS7 nodes on a linkset. A linkset is uniquely identified by the pair of point codes assigned to the nodes attached to each end of the linkset. A linkset may contain between 1 and 16 links. A link is a physical entity defined by a variety of standards that describe mechanical and electrical specifications. For the current discussion it will suffice to understand that a link is a full-duplex, serial, digital communication medium. The data bit rate of a link is currently typically either 56 or 64 kilobits per second.

A brief discussion of the purpose of the three types of Signal Units is now presented. Each link has a transient characteristic known as its "state". A link is controlled by the signaling points at each end of the link. The control of the link is directed by a state machine. Information about the state of each link is shared by the link controllers by exchanging LSSUs. A properly functioning link is said to be in an "Aligned, In-Service" state. If the Aligned, In-Service state of a link is lost, the link controllers are reset and the link is placed in a Proving Period of an Alignment state in which FISUs are exchanged to gauge the quality of the link. When the link is in the Aligned, In-Service state, MSUs and FISUs are exchanged in a continuous bi-directional stream. The MSU carries information used by Signaling Points to control telecommunications services and service features. MSUs also carry information for controlling several aspects of the SS7 network itself.

The FISU and the LSSU are only transmitted between the two Signaling Points connected by the link. Consequently, there is no need to control the flow of the FISU or LSSU. An MSU, however, may travel across the network and through certain Signaling Points called Signal Transfer Points (STP) to reach an ultimate destination. The STP is described in more detail below. Controlling the flow of MSUs through the SS7 network is a key concept behind mediated access and the method and system of the present invention. More detail on the classification, structure, and uses of the MSU are discribed below.

The SS7 protocol is a layered protocol which consists of four layers, generally referred to as "levels". The first three levels of the SS7 protocol are known as the Message Transfer Part (MTP). The lowest level, Level 1, is the physical level which supports a connection to the link. Level 2 is the Data Link level which defines data fields and procedures for handling MSU order preservation, error detection/correction, flow control, and link state control. Level 2 uses FISUs and LSSUs as described above to carry out its link state control function. Level 3 defines data fields and procedures for handling routing and internal distribution of signal units received by and transmitted from the signaling point. It also describes MSUs and procedures for managing the signaling network. Level 4 of the SS7 protocol consists of several different protocols called "user parts" and "application parts". The two principal MTP User Parts in North America are the ISDN User Part (ISUP) the Signal Connection Control Part (SCCP). ISUP defines MSUs and procedures for controlling switched trunk connections. SCCP defines MSUs and procedures for controlling connections and exchanging data in client/server applications, such as third number billing, Global Title Translation, and wireless roaming/call delivery.

The method and system of the present invention is based on the ability to discriminate and react to certain specific MSUs. An example of the structure or format of an MSU is shown in FIG. 1. The MSU includes a number of fields beginning with an Opening Flag 101, and ending with a Checksum 110 and a Closing Flag 111. An MSU may not include more than 279 octets.

A Backward Sequence Number (BSN) 102, a Backward Indicator Bit (BIB) 103, a Forward Sequence Number (FSN) 104, and a Forward Indicator Bit (FIB) 105 are collectively used by the Level 2 controllers at either end of a link to preserve the order and integrity of the bi-directional stream of MSUs on a link.

A Length Indicator (LI) 106 is a six bit field whose value indicates the length, in octets, of the signal unit fields between the LI octet and the Checksum 110. A two-bit Spare Field 107 which is part of the LI octet is unused. If the LI value is in the range of 3 to 62, the value represents the number of octets in the message. A value 63 indicates that the number of octets is between 62 and 272. An LI value of 0 indicates that the signal unit is an FISU, and an LI value of 1 or 2 indicates that the signal unit is an LSSU. A signal unit with an LI value greater than 2 indicates that the signal unit is an MSU.

A Service Information Octet (SIO) 108 contains a value that identifies the user part of the MSU. The SIO contains two fields that are four bits each. The first is a Service Indicator 112 that classifies MSUs according to the entity that produces and consumes a particular type of MSU, and further according to functions within those entities. The entities and functions associated with each Service Indicator value are shown in the table below:

| Service Indicator Values | Message Producer/Consumer Entity |
| --- | --- |
| 0 | Signaling Network Management |
| 1 | Signaling Network Testing-Regular Messages |
| 2 | Signaling Network Testing-Special Messages |
| 3 | SCCP |
| 4 | TUP |
| 5 | ISUP |
| 6 | DUP-Call and Circuit Related Messages |
| 7 | DUP-Facility Registration and Cancellation Messages |
| 8 | MTP Testing User Part |
| 9 | Spare |
| 10 | Spare |
| 11 | Spare |
| 12 | Spare |
| 13 | Reserved-Individual Network Use |
| 14 | Reserved-Individual Network Use |
| 15 | Spare |

The second is a Sub-service Field 113 which indicates the nature of the network of the MSU, being either national or international. In ANSI SS7 networks the Sub-service Field also contains MSU priority information.

The Signaling Information Field (SIF) 109 contains two principal elements: a Routing Label 114, and what is referred to as an MTP User Part (MTP-UP) 115. The Routing Label contains a Destination Point Code (DPC) 116, an Origination Point Code (OPC) 117, and a Signaling Link Selector (SLS) 118.

The SIO and DPC in combination identify the final recipient of the MSU. The SIO and OPC in combination identify the original sender of the MSU. The SLS 118 contains a value that determines a particular link in each linkset over which the MSU is transmitted. The SLS assists the network in maintaining the order of signal units in a message exchange, commonly referred to as a dialogue. By choosing the same SLS for each message in a dialogue, MTP users can be reasonably assured that the network will preserve the order in which they send their messages.

The MTP-UP 115 contains information that is specific to a particular application. The MTP user is identified in the Service Indicator 112.

SS7 Network

Figure 2:
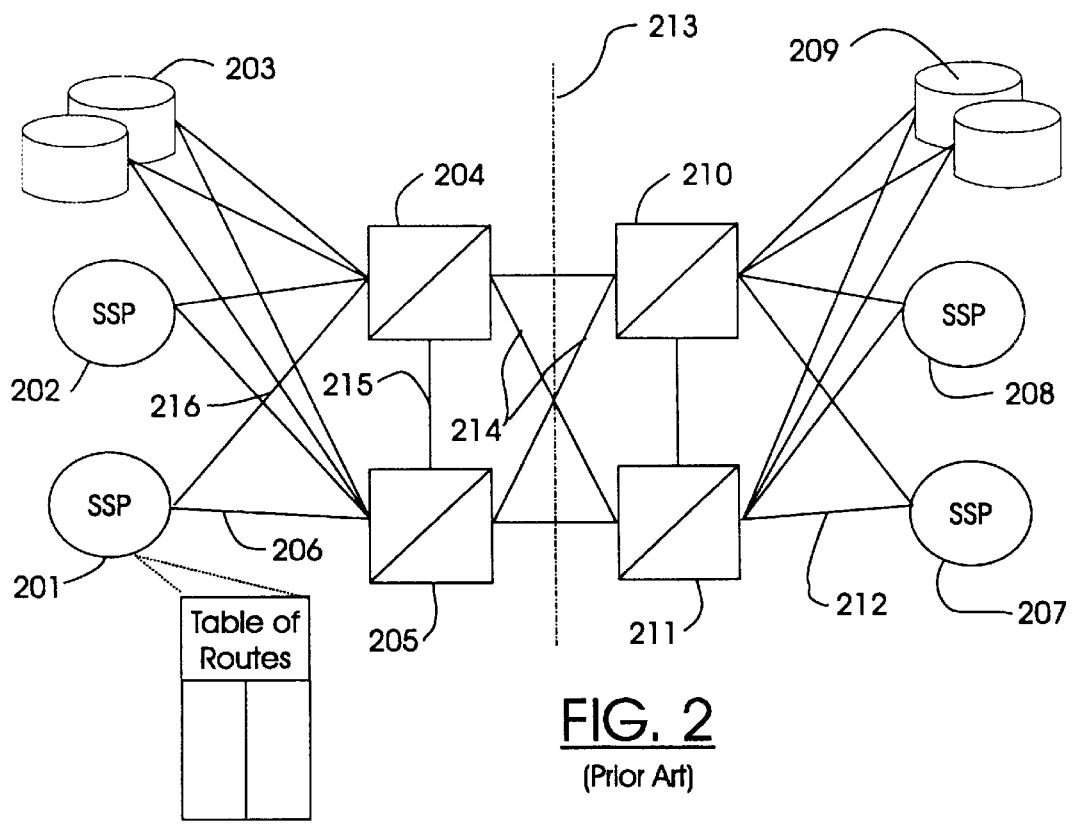
FIG. 2 is an abstracted schematic diagram of an SS7 network.

The diagram in FIG. 2 shows an example of interconnections between two SS7 networks. An SS7 network typically includes four basic physical elements: 1) Switching Service Points (SSP) 201, 202, 207, and 208, 2) Service Control Points (SCP), usually deployed as mated redundant pairs 203 and 209, 3) Signal Transfer Points (STP), usually deployed as mated pairs 204/205 and 210/211, and 4) linksets shown at 206, 212, 214, 215, and 216. The SSP and STP are configured as clients of the SCP. The SSP provides telecommunications switching service by interconnecting customer lines and inter-SSP trunks. The SCP is configured as a server to the SSP. The SCP is a computing platform usually including an associated database. The SCP typically provides information for supporting billing number services and dialed number translations for the SSP. The wireless telecommunications industry has redefined the SSP as a Mobile Switching Center (MSC), and the SCP as a Location Register.

The STP transfers signal units from one linkset to another. The STP uses information inside each packet, and information from routing tables stored in the STP to route signal units over the links in a linkset. A large number of STPs in the SS7 network permits increased signal point connectivity, linkset count reduction, and route diversity. Typically, two separate SS7 networks are interconnected through two pairs of STPs called a quad. The quad arrangement is indicated in FIG. 2 by reference numerals 204, 205; 210 and 211. The dot-dashed line 213 indicates a separation between the two SS7 networks. Note that each SSP 201, 202, and SCP 203 have a linkset to the STPs 204, 205. The STPs 204, 205 are a mated pair meaning they have similar routing capability. If the linkset 206 is lost, then the linkset 215 permits a signal to be transmitted from the STP 205 to the STP 204 and on to SSP 201 via the linkset 216.

Link Interface Structure

Figure 3:
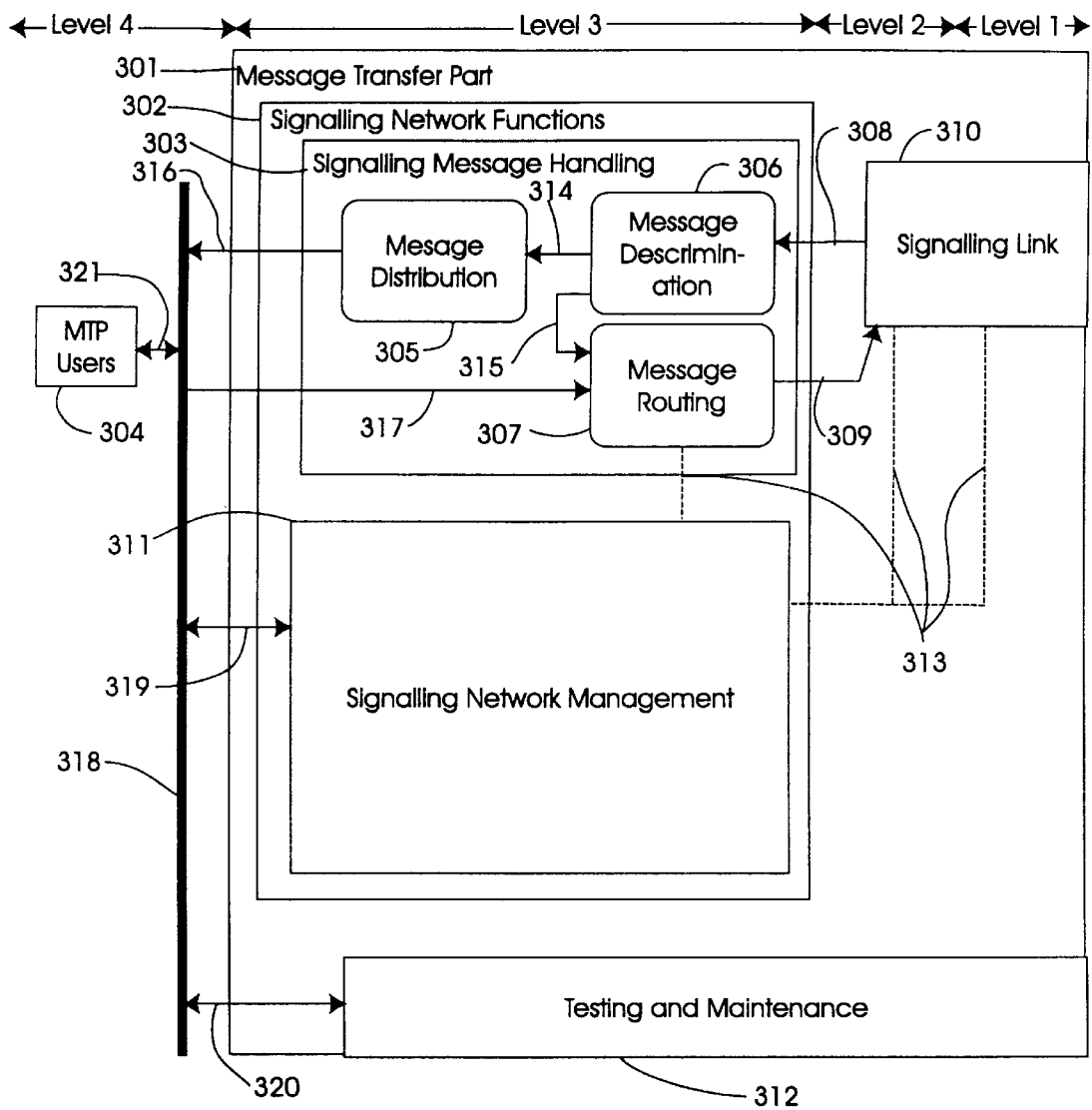
FIG. 3 is a diagrammatic model of the signaling system function.

Each link in a linkset connected to a signaling point typically has an interface structure modelled on the SS7 protocol. A model of the link interface structure is shown in FIG. 3. The main components of the link interface structure are the Message Transfer Part (MTP) 301, and MTP Users 304. Signal units enter and exit a signal point through the MTP section of the link interface. In an SSP the MTP User is the service switching function which is typically engaged in call setup on a trunk or a database query to an SCP. In the SCP the MTP User is the service control function which typically provides a response to a database query. In an STP the MTP User is the Global Title Translation function which is described more fully below.

The MTP includes a Signaling Link section 310 where signal units enter and leave the MTP. The Signaling Link section provides the physical link platform and manages the details of physical transmission and signal unit integrity and order. The Signaling Network Functions section 302 contains a Signaling Message Handling section 303 and a Signaling Network Management section 311. The Signaling Network Management section manages information relating to link availability, route availability, and traffic flow control on links and sends appropriate controls, indicated by reference 313, to other sections within the MTP. The Signaling Message Handling section 303 contains three sections called Message Distribution 305, Message Discrimination 306, and Message Routing 307.

The Signaling Link 310 sends MSUs to Message Discrimination 306 via an interface 308. Message Discrimination uses a value in the DPC Field 116 of the MSU (see FIG. 1) to determine if the MSU is addressed to this signaling point. If the MSU is not addressed to this signaling point and the transfer function is available, then the MSU is transferred to Message Routing 307 via an interface 315. If the MSU is addressed to this signaling point, then the MSU is transferred to Message Distribution 305 via an interface 314.

Message Distribution 305 examines the Service Indicator 112 in the MSU (FIG. 1) to determine if the MSU should be sent to: 1) MTP Users 304 via interfaces 316, 318, and 321; 2) Network Management 311 via interfaces 316, 318, and 319; or 3) Signaling Testing and Maintenance 312 via interfaces 316, 318, and 320.

Message Routing 307 selects a linkset and link if the MSU must be transmitted to another signaling point. If the transfer function is available in the signaling point then Message Routing receives MSUs directly from Message Discrimination 306 via the interface 315. MTP Users at 304 send MSUs to Message Routing via the interfaces at 321, 318, and 317. Signaling Network Management 311 sends MSUs to Message Routing via the interfaces 319, 318, and 317. Testing and Maintenance 312 sends MSUs to Message Routing via the interfaces 320, 318, and 317. Message Routing sends MSUs to the Signaling Link 310 of the chosen linkset and link via an interface indicated by reference numeral 309.

STP Functionality

There are two related routing functions in an STP. The first type of routing called MTP Routing is represented by Message Routing 307 in FIG. 3. The second type of routing is called SCCP Routing.

MTP Routing uses a network management defined Routing Table to associate a Point Code with a linkset. A Routing Table typically has an entry for every point code in the network. The Routing Table of the SSP 201 (FIG. 2), for example, might have entries for linksets used to route messages to each of network signaling points 202, 203, 204, 205, 207, 208, 209, 210, and 211. Each entry associates the point code of a signaling point with one of the linksets 206 or 216. The linksets 206, 216 may be configured as a linkset pair, called a Combined Linkset, which functions as a single linkset because it is connected to a mated pair of STPs at 204 and 205.

To find an MTP route for an MSU from the SSP at 201 to the SCP at 209, Message Routing 307 chooses a linkset by finding an entry in the Routing Table with a PC that matches the DPC of the MSU being sent, in this example the PC of the SCP 209. The entry in the Routing Table for SCP 209 will indicate that the Combined Linkset of linksets 206 and 216 is to be used to route the MSU to its destination. The SLS field in the MSU determines the link within the Combined Linkset on which the MSU is transmitted.

In the STP, SCCP Routing occurs in an MTP User application. SCCP Routing in the STP results in changes to the DPC Field 116 of an MSU because of interpretation of information within the MTP-UP 115 portion of an MSU (FIG. 1). SCCP Routing at the STP is invoked by sending an MSU to the STP as a destination with an SIO Service Indicator 112 set to indicate SCCP and including the Called Party Address parameter with the Routing Indicator set to Global Title Translation in the SCCP portion of the MSU.

A network management defined Global Title Translation (GTT) table in the STP has entries that associate all or a portion of a Global Title (that is, a telephone number) with a Point Code. In the Global Title Translation procedure, the GTT table is searched for a Global Title value that matches the value of the Global Title field in the Called Party Address parameter. If a match occurs, then the DPC 16 of the MTP Routing Label 114 (FIG. 1) is set to the Point Code stored in the matching entry of the GTT table. The modified MSU is returned to Message Routing 307 (FIG. 3) where MTP Routing occurs.

Gateway Screening (GWS)

An important feature in the STP is Gateway Screening (GWS). GWS permits network management to define criteria that enables or inhibits the transmission of any MSU through the STP.

Screening criteria are stored in a set of GWS tables. Each table entry is called a screen and has three fields: Reference, Criteria, and Action. The Reference field uniquely identifies the entry in a table. The Criteria field defines a value or a range of values of a particular field or parameter in the MSU. The Action field contains a value indicating what the next screening action will be if the Criteria values match those in the MSU being screened. Screening actions are GOTO, STOP, FAIL, and IGNORE. If the Criteria do not match those in the MSU being screened then the next screening action is an implied GOTO the next screen in the table.

An explicit GOTO action permits the screening process to advance to any specified position within any screening table. The STOP action indicates that screening should stop immediately and that the MSU must resume its progress through the STP. The explicit FAIL action indicates that screening should stop immediately and that the STP must discard the MSU and report the event. An implied FAIL occurs if the end of a screening table is reached and no matching values in the Criteria fields of the table have been found. The IGNORE action indicates that screening should stop immediately and that the STP must discard the MSU and not report the event.

Figure 4:
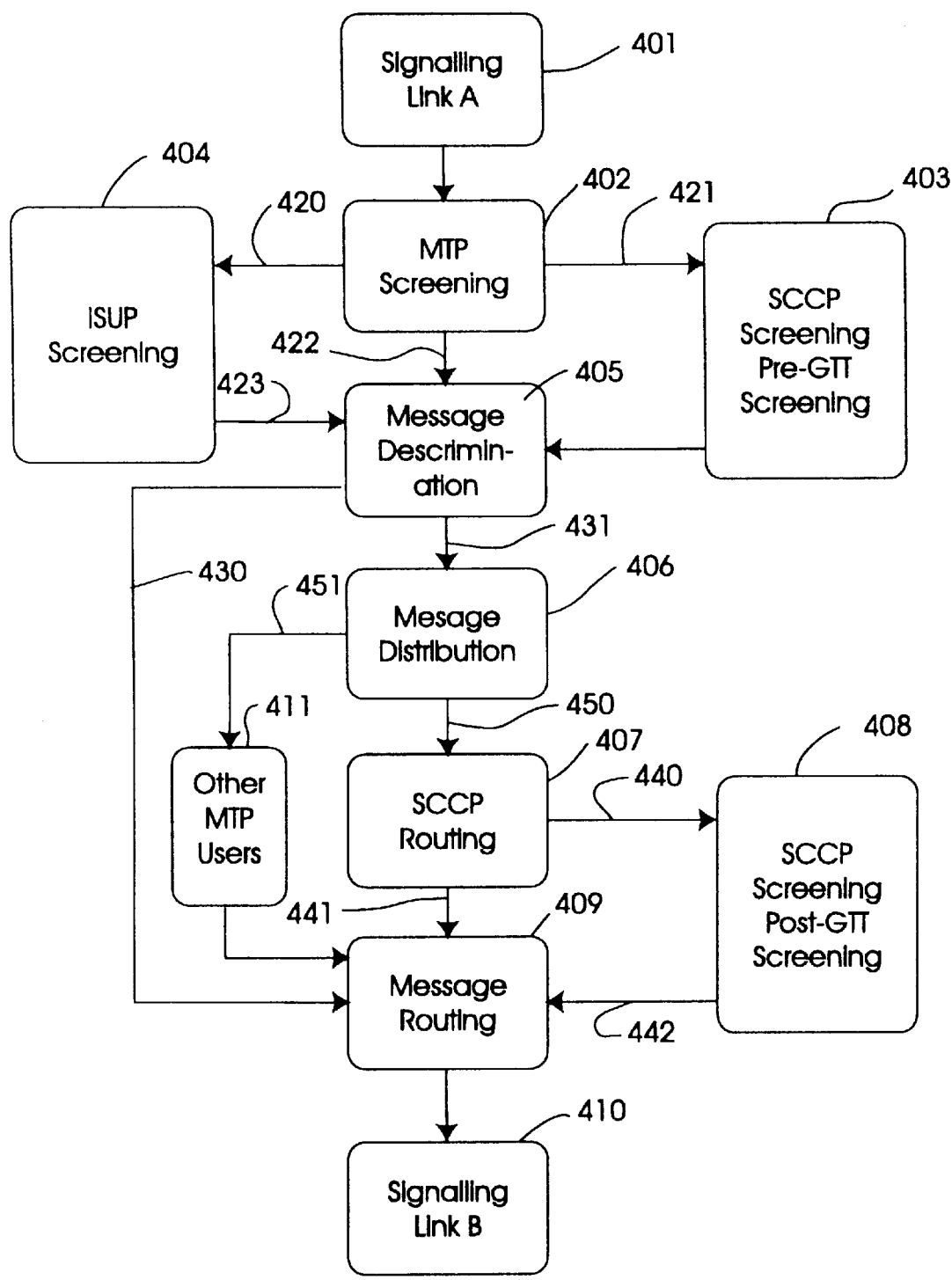
FIG. 4 is a schematic diagram showing the general relationship between an SS7 Message Transfer Part (MTP), an SS7 Signalling Connection Control Part (SCCP), and Gateway Screening processing.

The GWS tables are defined by linkset, MTP fields, ISUP parameters, and SCCP parameters. Each linkset having the GWS feature in an STP is configured to begin screening all incoming MSUS at a particular screen (that is, entry) in a particular MTP screening table. The diagram in FIG. 4 shows possible paths of progress of an MSU through the GWS process.

The GWS process begins when an MSU arrives at the STP on Signaling Link A at 401 (refer also to 310 of FIG. 3). The MSU is passed to MTP Screening 402 where the MTP screening tables for this linkset are used to screen the MSU. If the STOP action occurs, then the value in the Service Indicator field (112 in FIG. 1) is used to choose between the paths at 420, 421, and 422.

If MTP Screening finds a Service Indicator value for SCCP in the MSU, then it chooses the interface 421 for SCCP Screening: Pre-GTT Screening 403 where the SCCP portion of the MSU is screened. If a STOP action occurs, then the MSU is passed to Message Discrimination 405 (refer also to 306 in FIG. 3). If the MSU is addressed to this STP, then Message Discrimination sends the MSU to Message Distribution 406 (refer also to 305 in FIG. 3) using interface 431. Message Distribution examines the SIO of the MSU and sends the MSU to SCCP Routing 407 via interface 450 if the SIO value is SCCP, otherwise it sends the MSU to Other MSU Users 411 via interface 451.

The Global Title Translation is performed on the Global Title in the Called Party Address in the SCCP portion of the MSU at SCCP Routing 407. If the MSU came from a linkset that has the GWS feature configured, then the MSU is sent to SCCP Screening: Post-GTT Screening 408 via interface 440 where the SCCP portion of the MSU is screened again. Otherwise SCCP Routing sends the MSU to Message Routing 409 via interface 441 for final MTP routing toward its destination via Signaling Link B at 410.

If a STOP action occurs during SCCP Screening: Post-GTT Screening, then the MSU is sent via interface 442 to Message Routing 409 for final MTP routing to its destination via Signaling Link B at 410.

If MTP Screening finds a Service Indicator value for ISUP in the MSU, then it chooses the interface 420 for ISUP Screening 404. The ISUP portion of the MSU is screened using the ISUP screening tables for the linkset. If a STOP action occurs then ISUP Screening sends the MSU to Message Discrimination 405 via interface 423. An ISUP MSU is never destined for an STP; therefore, Message Discrimination sends the MSU directly to Message Routing 409 via interface 430 for final MTP routing toward its destination via Signaling Link B at 410.

If MTP Screening finds a Service Indicator value other than SCCP or ISUP in the MSU, then it chooses the interface 422 to Message Discrimination 405. This MSU will proceed to Signaling Link B at 410 via the interface 430, or it will reach Other MTP Users 411 where the MSU will terminate.

The discussion to this point has covered topics and terminology that relate to, support and facilitate the discussion of the method and system of the present invention which follows.

Signaling Mediation Point (SMP)

Figure 5A:
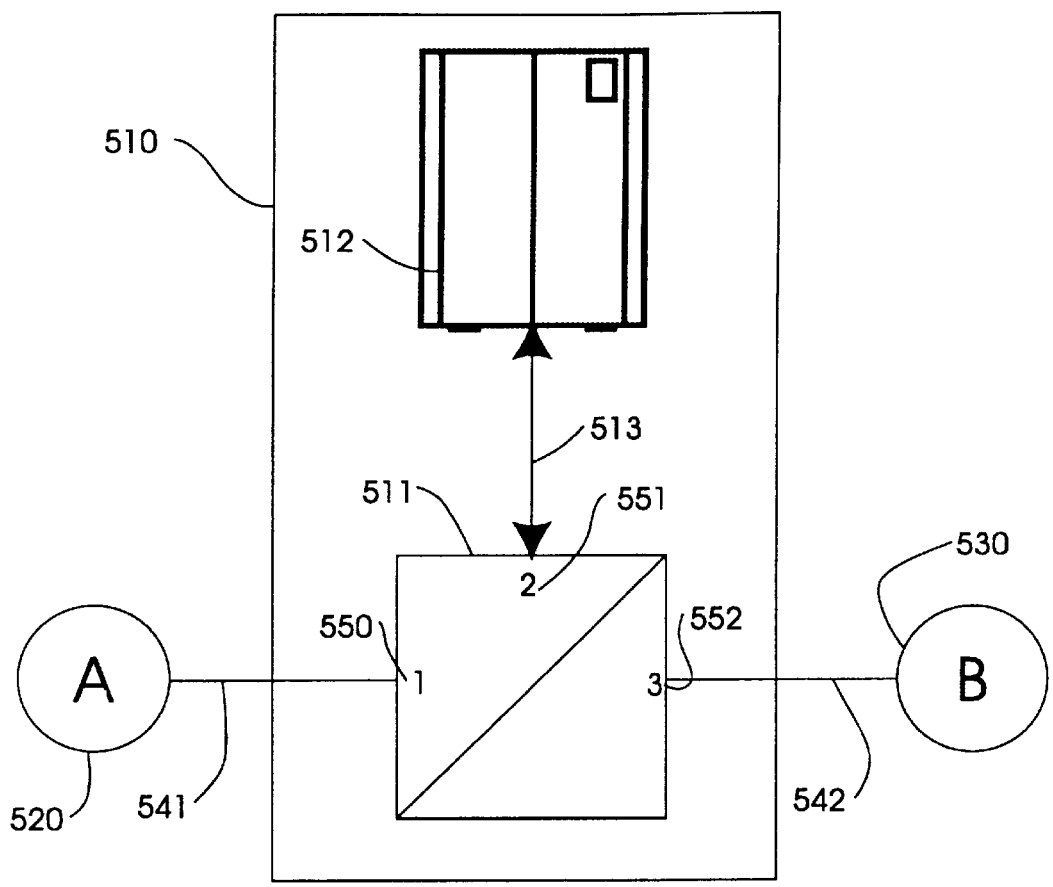
FIG. 5a is a schematic diagram of the physical relationship between an STP and a Mediation Function according to one embodiment of the invention.

A system architecture in accordance with the invention for providing signaling mediation access at an STP is shown in FIG. 5a. An SMP 510 includes a Mediation STP 511, a Mediation Function (MF) 512, and a communications connection 513 which connects the two. The SMP 510 mediates the flow of MSUs between signaling points 520 and 530. Signaling point 520 is connected to the SMP 510 via a linkset 541. Signaling point 530 is connected to the SMP 510 by a linkset 542. The Mediation STP 511 is connected to the linkset 541 at its port 1, indicated by reference 550. The Mediation STP 511 is connected to communications connection 513 at its port 2, indicated by reference 551. The MEDIATION STP 511 is connected to the linkset 542 at its port 3, indicated by reference 552. Since the Mediation STP 511 and the MF 512 are autonomous systems there is a need to coordinate such operational aspects as system availability and work flow using messages exchanged over the communications connection 513. This permits the MF 512 to be administered as a subsystem of the Mediation STP 511.

The mediation function described in the above identified co-pending application includes identifying MSUs requiring mediation and performing mediation actions on those MSUs. The Mediation STP identifies MSUs that are candidates for mediation and transmits the candidates to the MF 512 via the communications connection 513. The MF 512 completes the identification and performs access mediation on appropriate MSUs.

Mediation actions in the MF 512 are classified as either passive or active. Passive mediation is recording and reporting information gathered from mediation candidate MSUs. Active mediation involves altering and forwarding mediation candidate MSUs, or discarding mediation candidate MSUs. Mediation may be a combination of active and passive actions.

Identifying mediation candidate MSUs in the Mediation STP 511 is accomplished by, but not limited to, modifying the Gateway Screening feature which will be referred to as an Enhanced Gateway Screening (EGWS) feature in this discussion. The EGWS feature does not have sufficient information to completely identify an MSU needing mediation. For example, if some MSU type B is not allowed after some MSU type A, the EGWS feature cannot detect this situation because no record of receiving MSU type A is kept. The STP is optimized to switch MSUs between linksets without regard to previous MSU traffic on the linksets (with the exception of Signaling Network Management MSUs which may allow, restrict, or prevent flow on a particular linkset, or to a particular point code).

The EGWS feature is created by adding three new screening actions called STOP-COPY, FAIL-COPY, and IGNORE-COPY. The STOP-COPY action acts like the STOP action and it sends a copy of the screened MSU to a user defined destination. The FAIL-COPY action acts like the FAIL action and it sends a copy of the screened MSU to a user defined destination. The IGNORE-COPY action acts like the IGNORE action and it also sends a copy of the screened MSU to a user defined destination. The STOP-COPY action is useful in passive mediation. The FAIL-COPY and IGNORE-COPY actions are useful in active mediation.

Figure 5B:
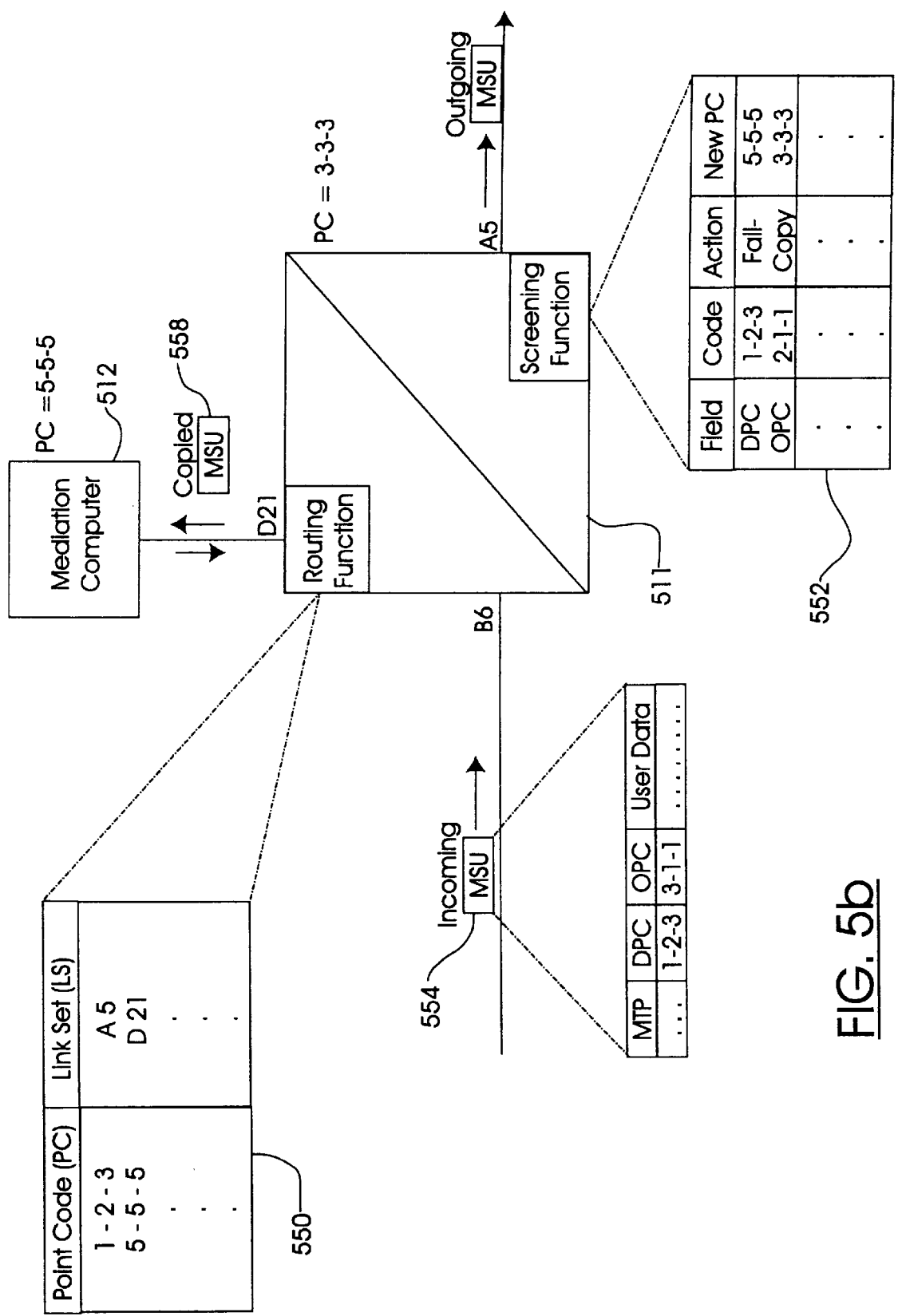
FIG. 5b is a schematic diagram of the mediation process according to one embodiment of the present invention.

FIG. 5b is a schematic diagram showing the Mediation STP 511 performing an exemplary access mediation process on an MSU 554 received on a gateway linkset B6. The Mediation STP 511 is equipped with an exemplary Routing Table 550 and Screening Table 552. The MSU 554 is transmitted to port 1 of the Mediation STP 511 over SS7 linkset B6. The MSU 554 has a DPC of 1-2-3 and an OPC of 3-1-1. On receipt of the MSU 554, the EGWS of the Mediation STP 511 is evoked because the linkset B6 is, for example, a linkset connection from another network. The MSU is screened as explained above using, for example, the Screening Table 552. In accordance with the Screening Table 552, on receipt of an MSU with a DPC of 1-2-3, the Mediation STP 511 is to FAIL-COPY the MSU 554. The copy of the MSU 554 is inserted in a new MSU which is assigned an OPC of 3-3-3, the PC of the Mediation STP 511, and a DPC of 5-5-5, the PC of the MF 512. The new MSU packet 558 is then passed to the MTP of Mediation STP 511 which consults the Routing Table 550 and determines that the linkset for DPC 5-5-5 is D21. The new MSU 558 is therefore transmitted over linkset D21 which is connected to the MF 512. On receipt of the new MSU 558, the MF 512 performs a preprogrammed action dictated by any predetermined criteria associated with the MSU 558 or the copied MSU 554 it contains. Since the Screening Action dictated FAIL-COPY, the original MSU 554 is not permitted to continue on its designated path by the Mediation STP 511, and it is not emitted into the network over linkset A5, as dictated by the Routing Table 550. However, the preprogrammed action initiated in the MF 512 on receipt of the MSU 558 may extract the original MSU 554 from the MSU 558, further screen the MSU 554 and return it to the Mediation STP 511. Since the linkset D21 is not subject to EGWS screening, the returned MSU 544 would be emitted into the SS7 network on linkset A5, as dictated by the Routing Table 550. It will be appreciated by those skilled in the art that the processing power and the configuration flexibility availabile in the MF 512 permits packets forwarded for mediation access to be further screened, modified, copied, logged or discarded. If network conditions or protocol requires it, supplementary messages or network management messages (i.e., TFR, TFP, TFA) may also be generated and inserted into an inter-node dialogue, or superfluous messages may be discarded from an inter-node dialogue. The MF 512 therefore permits a powerful and flexible implementaion of an SMP.

Figure 6:
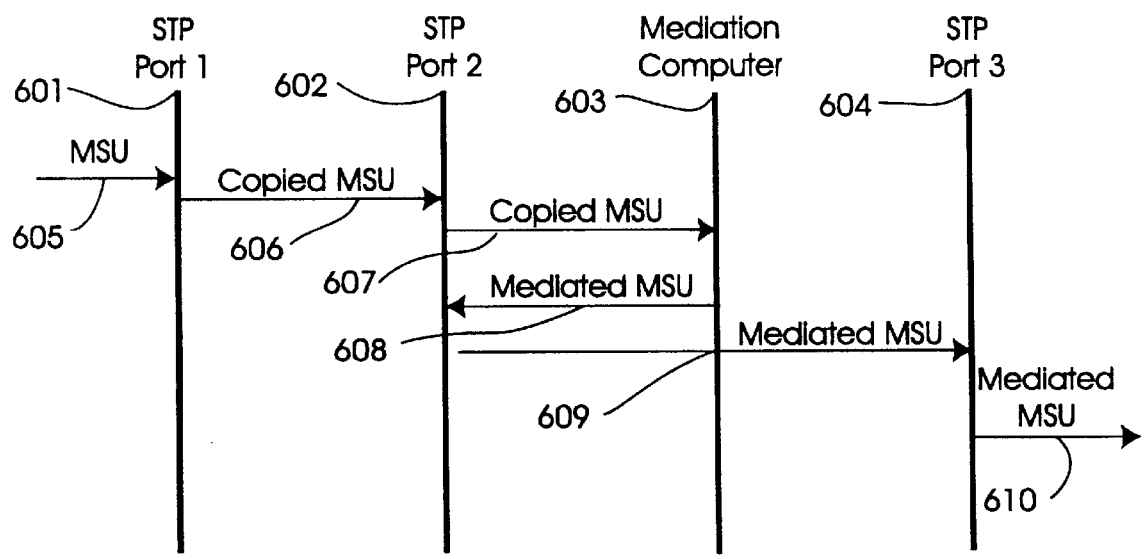
FIG. 6 is a message flow diagram showing a signaling message diverted to a Mediation Function, the Meditation Function returning the diverted message (referred to below as "Active Mediation"), and the STP forwarding the message, in relation to the embodiment shown in FIG. 5b.

FIG. 6 is a message flow diagram that shows the flow of an MSU that is screened and subjected to the FAIL-COPY or IGNORE-COPY actions. The vertical bars in FIG. 6 represent specific elements shown in FIG. 5a. The vertical bars 601, 602, 603, and 604 in FIG. 6 respectively represent Port 1 at 550, Port 2 at 551, the MF at 512, and Port 3 at 552 in FIG. 5a.

The message flow begins when the MSU 605 (FIG. 6) arrives at Port 1 of the MEDIATION STP at 601. Port 1 is configured with the EGWS feature. The MSU meets a network management defined screening criteria whose action is either FAIL-COPY or IGNORE-COPY. If the action is FAIL-COPY then the event is reported at the MEDIATION STP 511. If the action is IGNORE-COPY, then there is no report of the event at the MEDIATION STP 511. In the case of either action the MSU is not permitted to proceed on its intended route, but a copy of the MSU at 606 is routed to the MF via Port 2 at 602. The copied MSU at 607 is received by the MF 512 at 603. The MF 512 performs its access mediation function on the copied MSU and sends an access mediated MSU at 608 back to Port 2 (551 of MEDIATION STP 511) at 602. The normal Message Routing function transmits the mediated MSU at 609 to Port 3 (552) at 604 which transmits the mediated MSU at 610 into the SS7 network.

The access mediation process shown in FIG. 6 may actually output 0 to n mediated MSUs into the SS7 network. No mediated MSUs are output when the access mediation process discards the copied MSU. One mediated MSU is output when the access mediation process allows the copied MSU to pass through the network with or without modification. If more than 1 mediated MSU is output, the access mediation process has added MSUs to the dialogue between two signal points.

Figure 7:
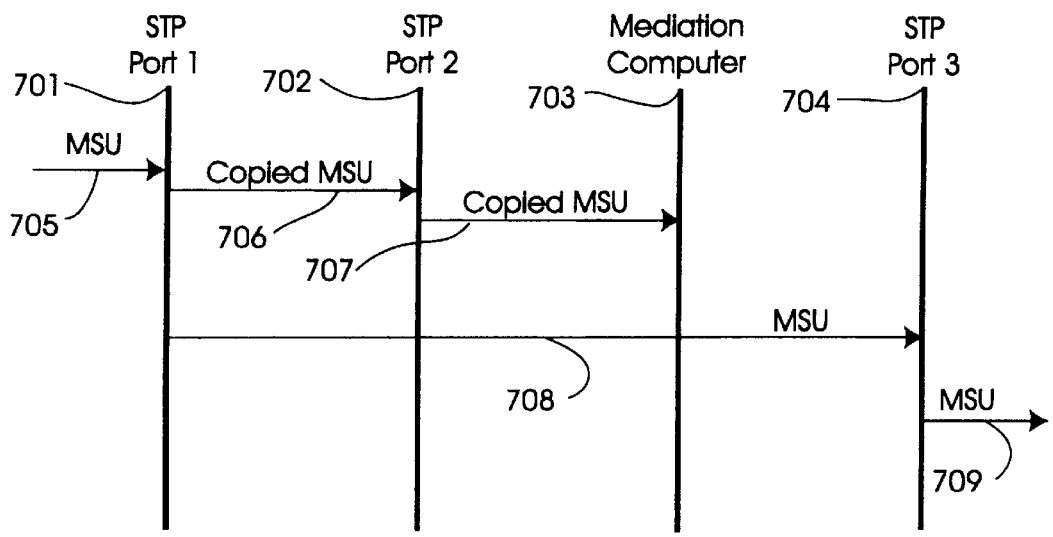
FIG. 7 is a signaling message flow diagram showing a message being copied to a Mediation Function while the original message proceeds to its intended destination unimpeded (referred to below as "Passive Mediation")

FIG. 7 shows the flow of an MSU that is screened and subjected to the STOP-COPY action. The vertical bars in FIG. 7 represent the same entities as the vertical bars in FIG. 6. The message flow begins when the MSU at 705 in FIG. 7 arrives at Port 1 of the MEDIATION STP 511 at 701. Port 1 is configured with the EGWS feature. The MSU meets a network management defined screening criteria whose action is STOP-COPY. The MSU at 708 is permitted to proceed on its intended route to Port 3 at 704 which transmits the MSU at 709 into the SS7 network. Meanwhile, a copy of the MSU at 706 is routed to the MF 512 via Port 2 at 702. The copied MSU at 707 then arrives at the MF 512 at 703 where the MF 512 performs its function on the copied MSU. The function of the MF 512 will depend on pre-programmed algorithms that determine whether the STOP-COPY message is archived or forwarded to network administration for inspection or further action.

In each of the examples described above, the process of copying a screened MSU to a network management defined destination, the MF 512, for example, is based on putting the original MSU into another data packet. The format of the other data pocket depends on communications connection 513 (FIG. 5) between the Mediation STP 511 and the MF 512 The communications connection 513 between the Mediation STP 511 and the MF 512 may be any suitable communications protocol. Two practical protocols are an SS7 linkset and a TCP\IP link. Other potential data communications protocols include Frame Relay, SMDS, and ATM.

Figure 8:
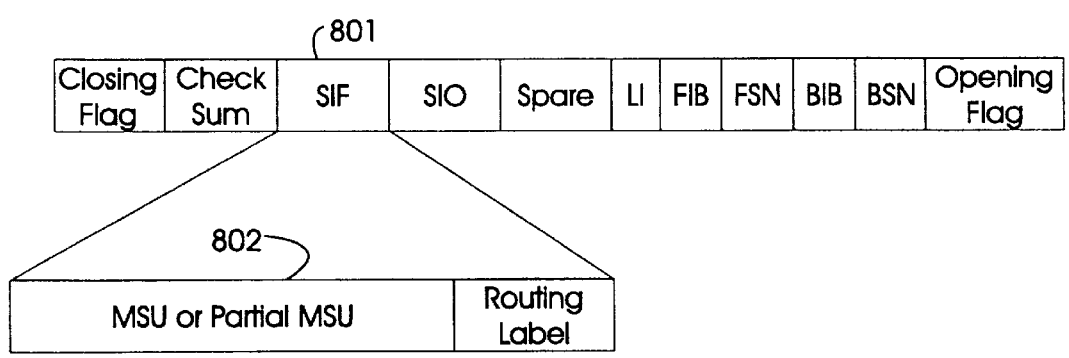
FIG. 8 is a schematic diagram showing an MSU or portion thereof embedded within another MSU according to an embodiment of the present invention.

FIG. 8 shows how an MSU at 802 is copied into the Signal Information Field at 801 of another MSU. As indicated, if an SS7 linkset is used for the communications connection between the Mediation STP 511 and the MF 512, there are instances when a complete message cannot be copied in one other MSU because of packet size constraints. In that instance, the copied MSU is partitioned into two parts which are respectively copied into the SIF of another MSU. How the copied MSU is partitioned is a matter of design choice.

The GWS feature is applied to linksets on an individual basis. As described above, the EGWS feature is not configured on the communication link between the Mediation STP 511 and the MF 512 to prevent circular mediation where the potential exists for an MSU to immediately return to the MF 512.

Those skilled in the art will note that the described preferred embodiment of the present invention is one variation of many ways of using a Signal Transfer Point to implement a Signaling Mediation Point as described above. The description of the current invention is intended to include all of the implied variations.

We claim:

1. A method of providing mediation access in a common channel signaling network at a signaling point having a transfer function, comprising the steps of:
   a) identifying a candidate message signal unit (MSU) that requires mediation among candidate signal units received on a linkset configured for mediation;
   b) transferring said candidate message signal unit or a copy of the candidate message signal unit to an access mediation function;
   c) receiving said candidate message signal unit or copies thereof at the access mediation function; and
   d) performing an access mediation process on the candidate message signal unit or copies thereof at the access mediation function.

2. The method as claimed in claim 1 wherein the step of identifying the candidate signal unit that requires access mediation is performed by an enhanced gateway screening function.

3. The method as claimed in claim 2 wherein the enhanced gateway screening function includes the enhanced functions of:
   a) STOP-COPY in which screening is terminated, the candidate signal unit is forwarded through the network and copied to the access mediation function;
   b) FAIL-COPY in which screening is terminated, the candidate signal unit is copied to the access mediation function and the original signal unit is sent to a predefined destination before it is discarded; and
   c) IGNORE-COPY in which screening is terminated, the candidate signal unit is copied to the access mediation function and the original signal unit is discarded.

4. The method as claimed in claim 1 wherein the access mediation process may include any one of:
   a) discarding the candidate signal unit or copy thereof received at the access mediation function;
   b) further screening the candidate signal unit or copy thereof at the access mediation function;
   c) copying the candidate signal unit or copy thereof to another destination;
   d) modifying at least one parameter of the candidate signal unit or copy thereof;
   e) adding at least one new signal unit related to the candidate signal unit or copy thereof.

5. The method as claimed in claim 1 wherein the step of transferring the candidate signal unit to the access mediation function involves copying the candidate signal unit into at least one other data packet and transferring the other data packet to the access mediation function.

6. The method as claimed in claim 5 wherein the other data packet is a common channel signaling message unit.

7. The method as claimed in claim 6 wherein the other data packet is a TCP/IP data packet.

8. A signaling mediation point for use in a common channel signaling network, comprising:
   a) a signaling point in the network having a transfer function and a screening function, the signaling point being connected to a plurality of signaling links on which data packets are received, and the signaling links are respectively selectively configured for mediation;
   b) an access mediation function for performing an access mediation process on selected data packets received by the signaling point on the signaling links configured for access mediation;

c) means for transferring the data packets to be mediated to the access mediation function; and d) means for transferring data packets back from the access mediation function to the signaling point.

9. The signaling mediation point as claimed in claim 8 wherein the common channel signaling network is an SS7 network.

10. The signaling mediation point as claimed in claim 9 wherein the data packets are MSUs.

11. The signaling mediation point as claimed in claim 9 wherein the means for transferring data packets from the signaling point to the access mediation function comprises a common channel signaling linkset.

12. The signaling mediation point as claimed in claim 11 wherein the common channel signaling linkset is an SS7 linkset.

13. The signaling mediation point as claimed in claim 8 wherein the means for transferring data packets from the signaling point to the access mediation function comprises a TCP/IP link.

14. The signaling mediation point as claimed in claim 8 wherein the access mediation function is managed as a subsystem of the signaling point.

15. The signaling mediation point as claimed in claim 8 wherein the screening function is an Enhanced Gateway Screening Function for identifying data packets that require access mediation among the data packets received on the signaling links configured for mediation.

16. The signaling mediation point as claimed in claim 8 wherein the signaling point transfers data packets to the access mediation function by copying the data packets that require access mediation into at least one new data packet that is transferred to the access mediation function.

17. The signaling mediation point as claimed in claim 8 wherein the access mediation function is adapted to modify, delete or change any data packet received on a signaling link configured for mediation if the data packet requires mediation, and further adapted to add a new data packet related to the data packet requiring mediation if network conditions or protocol require the new data packet.

18. The signaling mediation point as claimed in claim 17 wherein the new data packet is a one of a supplementary message and a network management message.

19. A system for providing signaling mediation access in a common channel signaling network, comprising in combination:

a signal transfer point connected to a plurality of signaling links in the common channel signaling network, the respective signaling links being selectively configured for signal mediation, the signal transfer point including an enhanced gateway screening function for determining whether a signaling unit received on a signaling link configured for mediation requires mediation, and a routing function for forwarding signaling units requires mediation to a mediation computer;

the mediation computer being adapted to receive signaling units that require mediation and perform mediation actions on the signaling units.

20. The system as claimed in claim 19 wherein the enhanced gateway screening function includes the enhanced functions of:

a) STOP-COPY in which screening is terminated, the candidate signal unit is forwarded through the network and copied to the access mediation function;

b) FAIL-COPY in which screening is terminated, the candidate signal unit is copied to the access mediation function and the original signal unit is sent to a predefined destination before it is discarded; and c) IGNORE-COPY in which screening is terminated, the candidate signal unit is copied to the access mediation function and the original signal unit is discarded.

* * * * *